United States Patent [19]
Walker et al.

[11] 3,768,781
[45] Oct. 30, 1973

[54] SHOCK ABSORBING STRUCTURE

[75] Inventors: Grant W. Walker; Duane B. Ford; Lester N. Meinzer, all of Sacramento; Reid S. Larsen, Fair Oaks, all of Calif.

[73] Assignee: Dynamics Research and Manufacturing, Inc., Sacramento, Calif.

[22] Filed: Mar. 30, 1972

[21] Appl. No.: 239,809

Related U.S. Application Data

[62] Division of Ser. No. 69,872, Sept. 4, 1970, Pat. No. 3,695,583.

[52] U.S. Cl. ................................. 256/1, 256/13.1
[51] Int. Cl. ........................................... E01f 15/00
[58] Field of Search ........................ 256/1, 13.1; 114/219; 104/254, 256; 267/139, 140, 141, 116; 293/DIG. 5

[56] References Cited
UNITED STATES PATENTS

| | | | |
|---|---|---|---|
| 3,614,148 | 10/1971 | Favary | 267/139 |
| 1,132,315 | 3/1915 | Evans | 104/254 |
| 1,420,065 | 6/1922 | Stillman | 267/139 X |
| 1,696,429 | 12/1928 | Christen | 267/139 X |
| 1,503,049 | 7/1924 | Jezek | 293/DIG. 5 |

FOREIGN PATENTS OR APPLICATIONS

| | | | |
|---|---|---|---|
| 446,174 | 6/1927 | Germany | 293/55 B |
| 532,304 | 1/1941 | Great Britain | 114/219 |

*Primary Examiner*—Dennis L. Taylor
*Attorney*—Marcus Lothrop et al.

[57] ABSTRACT

For use with an upright abutment, a belt at its ends is mounted on the abutment and has its intermediate portion disposed with the belt web vertical and cantilevered out from and spaced away from the abutment. Frangible energy absorbers are disposed between the belt and the abutment and are supported thereon. Vertical cleats reinforce the belt web. In large installations, vertical diaphragm walls of belts are used adjacent energy absorbers. Anchor cables may pass through and engage the diaphragms or belts.

3 Claims, 6 Drawing Figures

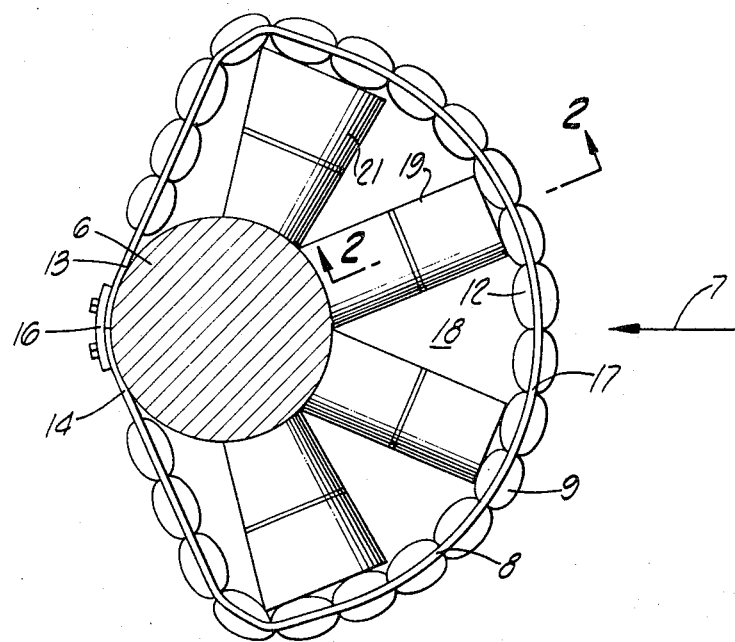
FIG. 1.
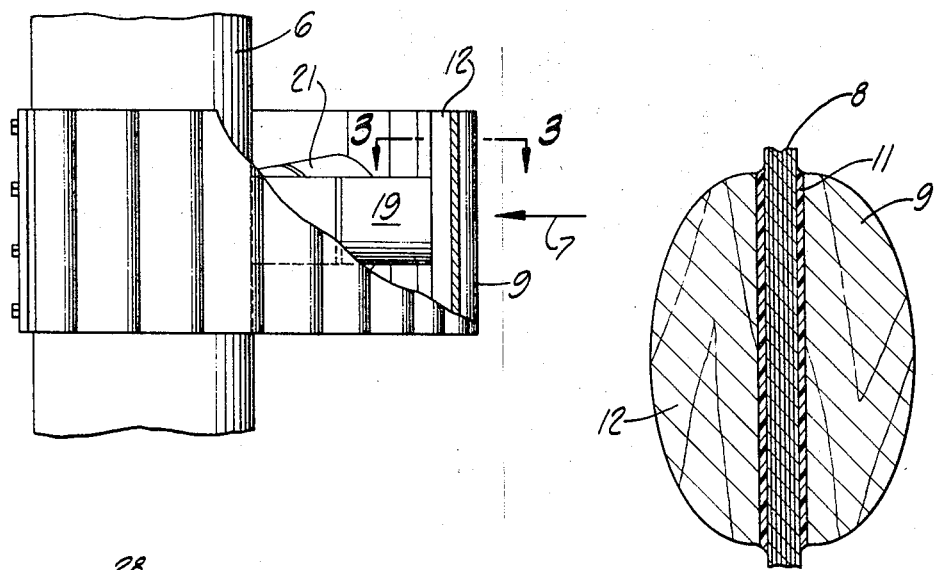
FIG. 2.
FIG. 3.
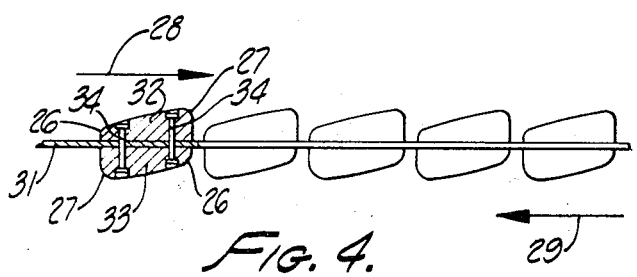
FIG. 4.

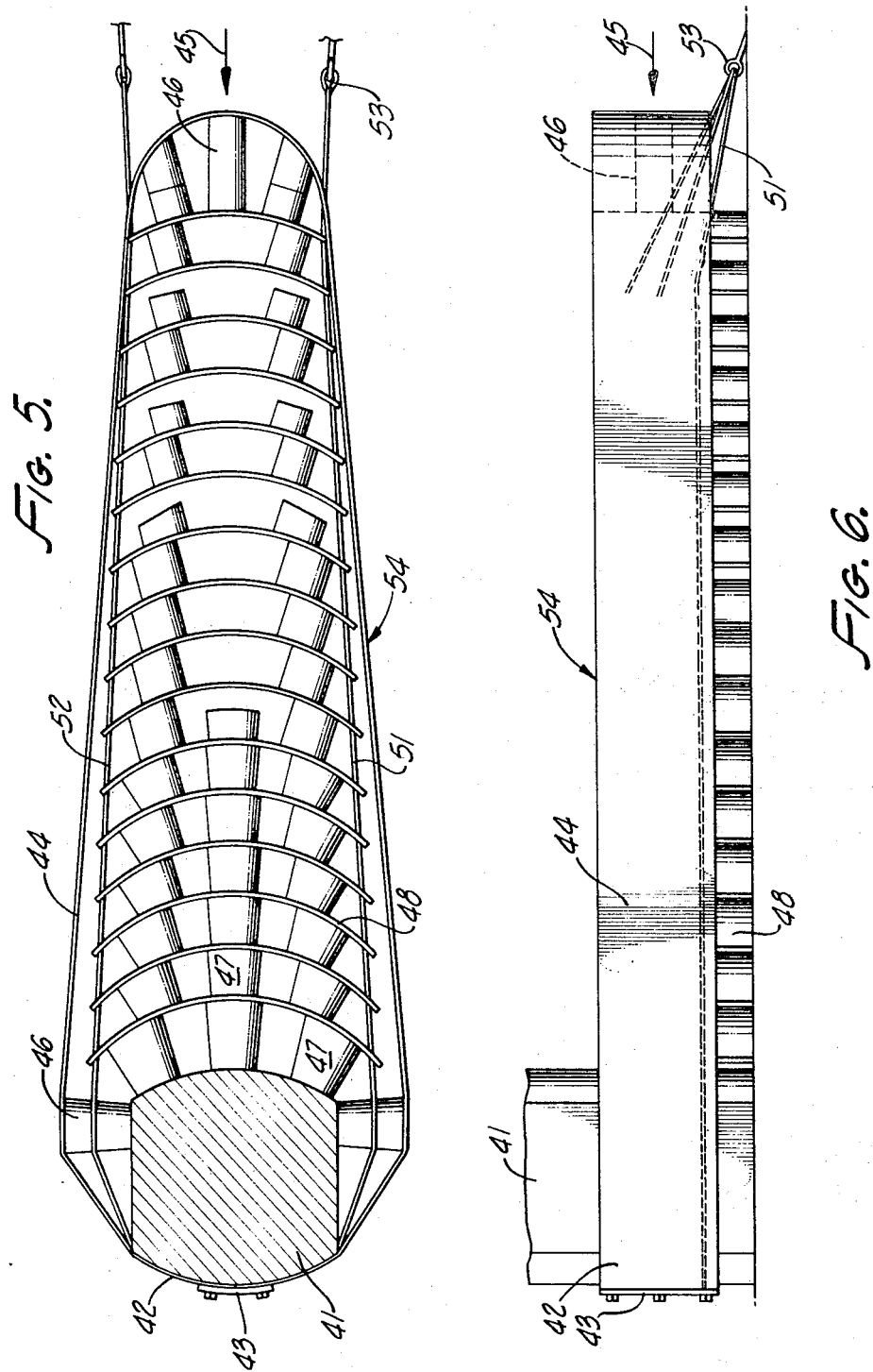

SHOCK ABSORBING STRUCTURE

This is a division of application Ser. No. 69,872, filed Sept. 4, 1970, now U.S. Pat. No. 3,695,583.

It is becoming increasingly necessary to protect stationary structures alongside vehicular ways or highways not only for the safety of the structural elements themselves but likewise for the safety of the vehicles and their occupants in the event of collisions. In these and in other similar installations, the need is for an energy absorbing installation which is highly effective to absorb or dissipate the forces involved in an impact and to be relatively inexpensive. It is important that the arrangement can easily be installed in the first instance and can be replaced whenever necessary without undue labor or cost. Furthermore, the materials of the shock absorbing structure must in themselves be relatively safe and harmless and in responding to an impact must not compound the difficulty.

It is therefore an object of the invention to provide a shock absorbing structure, which can economically and simply be made and installed on an abutment and which can readily be maintained and replaced when necessary.

Another object of the invention is to provide a shock absorbing structure in which the materials involved are for the most part frangible and do not cause any additional hazard upon impact.

Another object of the invention is to provide a shock absorbing structure which in many instances will simply act as a fender or as a buffer to cause a carom or rebound of an impacting vehicle.

Another object of the invention is to provide a shock absorbing structure that can withstand the customary environment, both freezing and high temperature, and which does not require any particular maintenance over long periods of time unless impacted.

Another object of the invention is in general to improve shock absorbing devices.

Other objects together with the foregoing are attained in the embodiments of the invention described in the accompanying description and illustrated in the accompanying drawings, in which:

FIG. 1 is a cross section on a generally horizontal plane through an abutment provided with a shock absorbing structure in one form according to the invention;

FIG. 2 is a side elevation of the arrangement of FIG. 1, a portion being broken away to illustrate the interior in the cross section, that section being on a plane indicated by the line 2—2 of FIG. 1;

FIG. 3 is a cross section to an enlarged scale, the plane of section being indicated by the line 3—3 of FIG. 2;

FIG. 4 is a view comparable to a portion of FIG. 1 but showing a modified version of a cleated belt included in the invention;

FIG. 5 is a plan and cross section of a device comparable to that of FIG. 1 but showing a shock absorbing structure for installation with an enlarged abutment and under severer conditions than that of FIG. 1;

FIG. 6 is a side elevation of the structure disclosed in FIG. 5.

While it is recognized that the shock absorbing structure pursuant to the invention can be embodied in various different environments; for example, in docks, alongside buildings, in parking lots, for railroad use and otherwise, it is particularly applicable to an installation alongside of or in connection with a vehicular highway from or alongside of which there is provided an upstanding abutment 6. In FIGS. 1 and 2, this takes the form of a cylindrical column and can be considered to be made of concrete such as a reinforced concrete pillar or highway support.

Pursuant to the invention, there is provided a shock absorbing structure to take care of possible impacts against the abutment 6 from many directions but particularly from the direction indicated by the arrow 7. For this purpose there is provided, as part of the shock absorbing structure, a belt 8. This conveniently is a woven fabric belt or can be a composite structure; for example, made up of several layers such as four layers of a polypropylene cloth with the layers, if not otherwise secured, adhesively attached to each other by impregnation with a polyester resin. To this belt 8 there is preferably attached a plurality of cleats 9 conveniently of a plastic material or alternatively of wood, fiber glass or light metal. The cleats have a generally semi-ovoid shape and are secured in position in any convenient way; for example, by a layer 11 of glue or other adhesive or, in some cases, by bolts or rivets although the adhesive construction is presently preferred.

While the cleats 9 can be dispensed with entirely for very light service or can be applied on but one side of the belt, they are preferably applied on the opposite sides of the belt. The cleats 12 on one side of the belt are arranged, preferably, directly opposite the cleats 9 on the other side of the belt and are similarly fabricated and secured in position.

Either with or without the cleats, the belt 8 is secured at its opposite ends 13 and 14 to the abutment 6 by an appropriate fastening means 16 and is arranged with the belt web disposed vertically. That is explained by indicating that the belt thickness is relatively small or thin whereas the belt width, that is, the width of the belt web is relatively great with respect to its thickness so that when the belt is disposed in position, as shown, its web or width extends in a generally vertical direction. The belt in this position continues to be fairly flexible against a horizontal force but is relatively stiff or rigid against a vertical force. The intermediate portion 17 of the belt is trained around the abutment 6 and is spaced therefrom to leave an intervening space 18. The belt tends to cantilever out from its fastenings 16 and is generally self-supporting, although not necessarily of a definite shape when viewed in plan. The vertical strength is greatly augmented by the cleats 9 and 12, although the cleats, being spaced apart somewhat do not materially interfere with the general flexibility of the belt against horizontal impact.

Disposed in the space 18 between the abutment 6 and the intermediate portion 17 of the belt web are energy absorbing structures 19 substantially as shown in the copending application of Grant W. Walker et al., entitled "Energy Absorbing Device," filed May 25, 1970 with Ser. No. 40,220. These energy absorbing structures are arranged at some distance above the ground with one end of an energy absorbing device against the cleats 12 or directly against the belt web and the other end against the abutment 6. Often, friction alone is sufficient to hold the energy absorbers in place, although they can be fastened to the abutment or the belt web or both but in any case are supported by the abutment and belt web. In some instances, some of the energy absorbers 21 are not circular cylindrical as indicated in one location in FIG. 1, but are of a truncated, conical shape as shown in another location in FIG. 1, although otherwise they are substantially the same as disclosed in the mentioned copending application.

In a typical example, four such energy absorbing devices are arranged with their axes substantially horizontal and radial to the abutment 6 and the belt 8 is relatively taut when the installation is completed. Usually the belt is spaced some distance above the ground preferably at about the height of an automobile bumper or a major automobile body portion.

In operation, when a vehicle approaching in the direction of the arrow 7 hits the shock absorbing structure the intermediate portion 17 of the belt is somewhat deflected and flexed and if the impact is relatively light and within the resiliency of the absorbers 19, very often nothing additional occurs. On the other hand, if the impact is severe then the belt yields and permits the frangible energy absorbers 19, 21 and the like to crush and transform the impact energy so that the vehicle is slowed or stopped and the abutment 6 is saved.

A similar situation transpires when the impact is not directly in the direction of the arrow 7 but rather is at another radial direction with respect to the abutment 6 or is a glancing blow to the belt itself. In this instance, the belt also can yield or flex and the cleats themselves assist in transmitting the force to the other parts of the structure with results as previously described. In cases wherein the abutment 6 might be struck from any direction, such as the base of a light standard in a parking lot, the construction, instead of being approximately semi-circular in plan, as seen in FIG. 1, can be circular around the abutment.

In some instances, as shown in FIG. 4, it is preferred to make the cleats other than of a semi-ovoid shape. Instead they are made so that at their leading edges 26 they are relatively close to the belt, whereas at their trailing edges 27 they are relatively far from the belt when considered in the immediate direction of approach of a vehicle such as is indicated by the arrows 28 and 29. In this instance also, just for illustration, the cleats are installed in pairs on the belt 31 and the cleats 32 and 33 are held in place by through rivets 34. This cleat shape tends to keep the cleats from being torn off the belt and tends to prevent entanglement with projecting parts of a vehicle sliding along the belt or giving it a glancing blow.

Under some conditions much greater resistance to impact and much greater shock absorbing capacity is requisite. If the traffic is appropriately channeled, the shock absorbing structure itself takes on a directional characteristic. As shown particularly in FIGS. 5 and 6, an abutment 41 is provided with a belt 42 secured thereto at its ends by fastenings 43. The intermediate portion 44 of the belt extends a substantial distance ahead of the abutment 41, the direction of potential impact on which is generally indicated by the arrow 45. In this instance the belt is spaced and supported substantially as before since there are horizontally disposed energy absorbers 46 spaced above the ground and installed at different locations.

There are also installed many other energy absorbers 47 in any selected pattern. The numerous energy absorbers are preferably spaced apart and maintained in position by intervening diaphragm walls 48 that conveniently are curved substantially about the abutment 41. The diaphragm walls can be thin sheets of suitable material or can be large sections of belt as shown in FIG. 1. In most cases, the diaphragms are positioned and supported by a plurality of generally longitudinally extending cables 51 and 52 that at one end are secured to the abutment 41 and at the other end are connected by anchors 53 to the ground.

In the operation of this structure, an impact from head-on in the direction of the arrow 45 acts substantially as previously described since the belt portion 44 tends to distribute the impact and itself to flex and give and yield in order that, if necessary, as many as possible of the adjacent energy absorbers 46 and 47 will come into play to translate the energy of the impacting device into crushing or disintegration of the energy absorbers.

Very often in this type of installation, however, the impact is not head on from the direction of the arrow 45 but may very well be a glancing blow in the direction of an arrow 54 in which instance the belt tends to flex and yield in a lateral or transverse direction partly against the diaphragm walls 48 or belts and partly against the cables 51 and 52 with the entire structure quite possibly yielding substantially in a transverse direction and if the impact is severe enough, permitting the belt to yeild sufficiently so that the contained or surrounded energy absorbers are fragmented. Particularly when belts are used as diaphragms, the impact forces are distributed so that each transverse row of absorbers tends to disintegrate before the forces disintegrate the next row so that the absorbers remain in position relatively well up to the time it is their turn to disintegrate. High speed moving pictures of numerous impacts show this function clearly.

The exact shape of the shock absorbing structure can be varied from time to time or from installation to installation depending upon the traffic conditions, the impact to be resisted or parried, the shape or nature of the abutment and various other factors; but in every instance, it has been found beneficial to use a somewhat flexible belt arranged vertically on edge and acting horizontally as a cantilever so that it is virtually self-supporting and forms a partial enclosure at least for a number of energy absorbers disposed between the belt and the abutment. The maintenance or upkeep of the arrangement is relatively low and the original installation is usually quite simple and economical. If an impact does shatter a number of the energy absorbers, they can readily be replaced with the belt or belts being repositioned and in the FIGS. 5 and 6 version with the cables themselves retightened if necessary. In the FIGS. 1 to 4 version, it is usually necessary only to replace some of the energy absorbers since the belt itself is not often badly damaged, although if it is it can quite readily and economically be replaced.

What is claimed is:

1. A shock absorbing structure for use with an abutment upstanding from the ground comprising a flexible belt including a relatively thin relatively wide web, means for mounting the ends of said belt in a predetermined location relative to said abutment with the intermediate portion of said web extending from said abutment to a forward area remote from said abutment and disposed with the width thereof substantially in a vertical plane and cantilevered horizontally away from said abutment to leave an intervening space, a plurality of vertically extending diaphragm walls disposed in said space and arranged successively one behind the other between said abutment and said forward area, and a plurality of horizontally extending, frangible energy absorbing spacers disposed one behind the other in rows between said belt intermediate portion and said diaphragm walls and between said successive diaphragm walls and between said diaphragm walls and said abutment.

2. A shock absorbing structure as in claim 1 in which said diaphragm walls are curved about said abutment.

3. A shock absorbing structure as in claim 1 in which substantially horizontal cables are secured at their ends to said abutment and to the ground and between their ends pass through said diaphragm walls in mutually supporting relationship.

* * * * *